(12) United States Patent
Yun et al.

(10) Patent No.: US 7,905,617 B2
(45) Date of Patent: Mar. 15, 2011

(54) BACKLIGHT UNIT

(75) Inventors: Mi Jeong Yun, Daejeon-si (KR); Young Taek Kim, Gyeonggi-do (KR); Onishi Tomohisa, Gyeonggi-do (KR); Jong Jin Park, Daejeon-si (KR); Geun Young Kim, Seoul (KR)

(73) Assignee: Samsung LED. Co., Ltd., Gyunggi-Do (KR)

( * ) Notice: Subject to any disclaimer, the term of this patent is extended or adjusted under 35 U.S.C. 154(b) by 185 days.

(21) Appl. No.: 12/273,182

(22) Filed: Nov. 18, 2008

(65) Prior Publication Data
US 2010/0073903 A1 Mar. 25, 2010

(30) Foreign Application Priority Data
Sep. 23, 2008 (KR) .................. 10-2008-0093102

(51) Int. Cl.
*G09F 13/04* (2006.01)
(52) U.S. Cl. ........ 362/97.1; 362/330; 362/610; 362/615
(58) Field of Classification Search .................. 362/97.1, 362/97.3, 97.2, 606, 607, 610, 613, 612, 362/616, 555, 560, 561, 511, 330, 615
See application file for complete search history.

(56) References Cited

U.S. PATENT DOCUMENTS

| | | | | |
|---|---|---|---|---|
| 7,080,933 B2 * | 7/2006 | Chen et al. | ..... | 362/616 |
| 7,188,988 B2 * | 3/2007 | Koganezawa | ..... | 362/616 |
| 7,413,334 B2 * | 8/2008 | Baba | ..... | 362/616 |
| 2008/0266896 A1 * | 10/2008 | Chang | ..... | 362/606 |
| 2009/0273732 A1 * | 11/2009 | Shimura et al. | ..... | 349/65 |
| 2009/0273733 A1 * | 11/2009 | Shimura et al. | ..... | 349/65 |
| 2009/0316074 A1 * | 12/2009 | Tomiyoshi | ..... | 349/65 |

FOREIGN PATENT DOCUMENTS
KR   10-2007-0104149 A   10/2007
* cited by examiner

*Primary Examiner* — Evan Dzierzynski
(74) *Attorney, Agent, or Firm* — McDermott Will & Emery LLP

(57) ABSTRACT

Provided is a backlight unit including a plurality of light guide plates that each include a first side surface having a housing groove, an upper surface extending from an edge of the first side surface, a flat lower surface facing the upper surface, and a second side surface facing the first side surface of an adjacent light guide plate, and are disposed in parallel; a plurality of light source units that are disposed in the housing grooves of the respective light guide plates; and a bottom case that houses the light guide plates and the light source units.

11 Claims, 4 Drawing Sheets

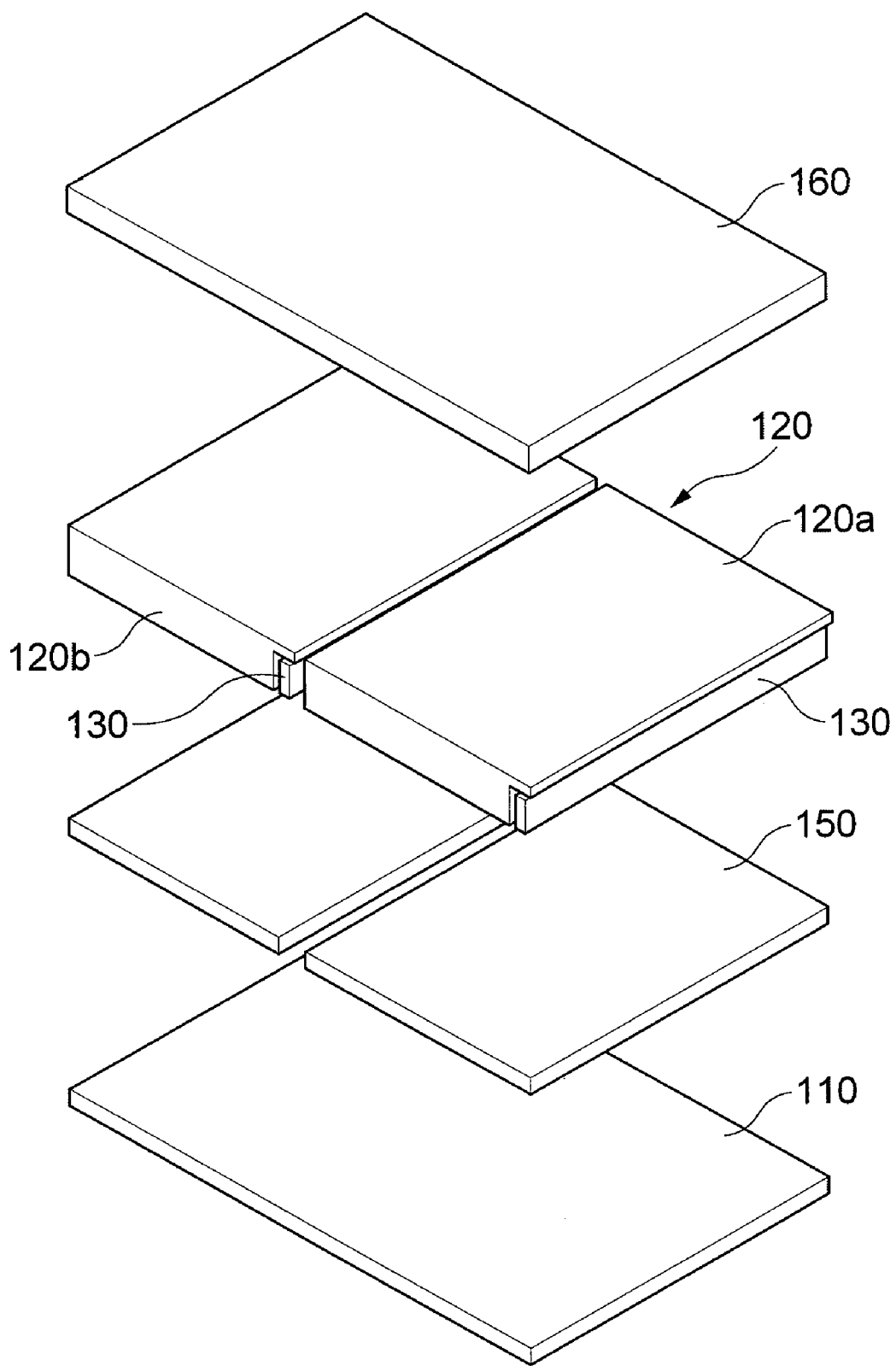
[FIG. 1]

[FIG. 2]
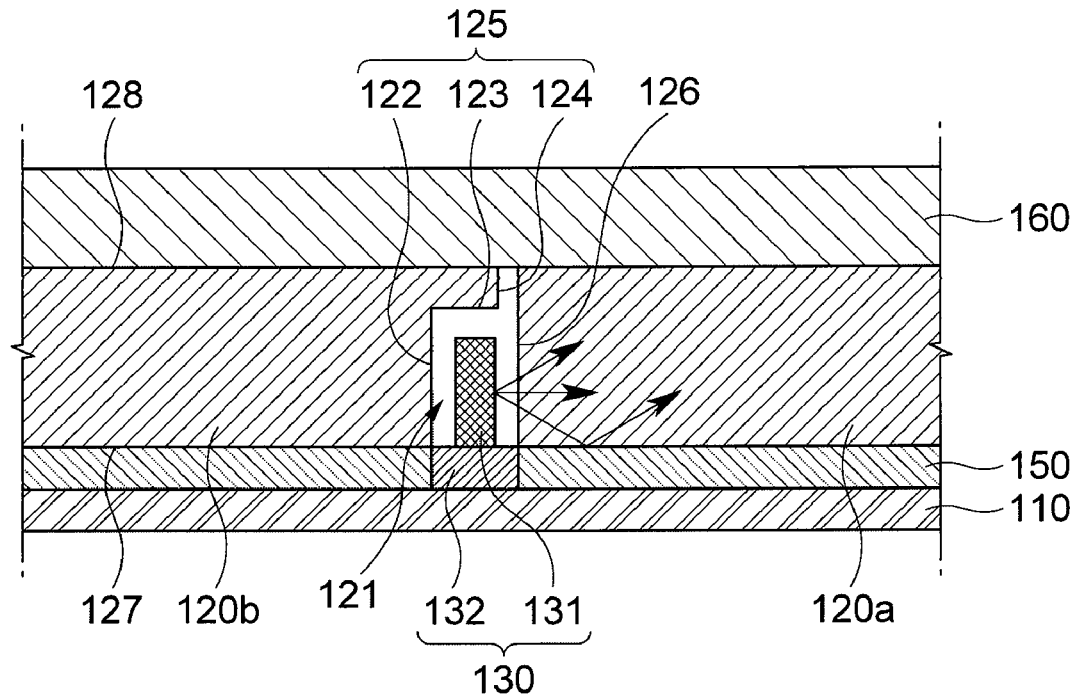
[FIG. 3A]
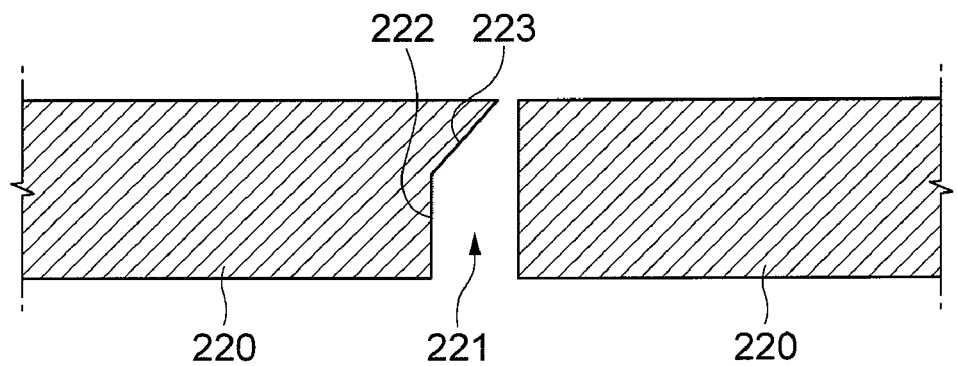
[FIG. 3B]
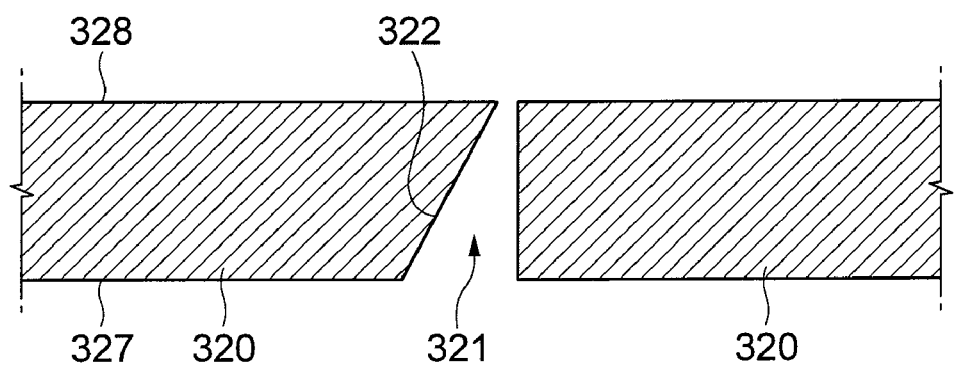

[FIG. 3C]
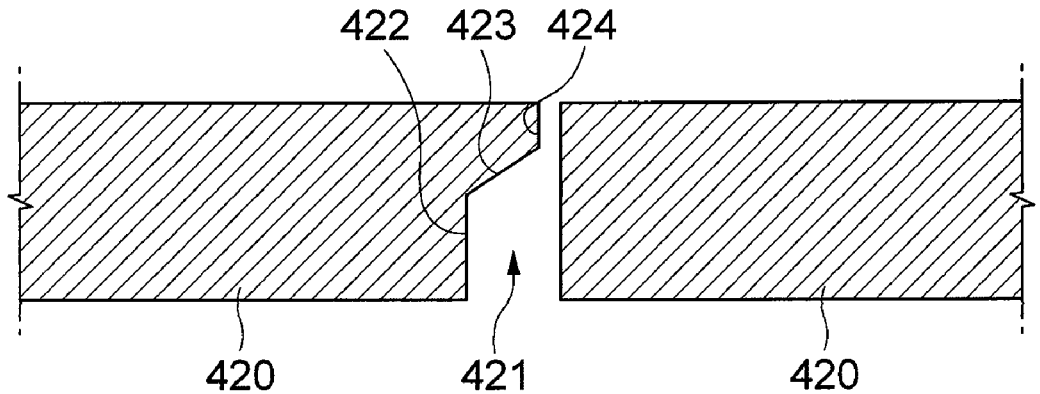
[FIG. 3D]
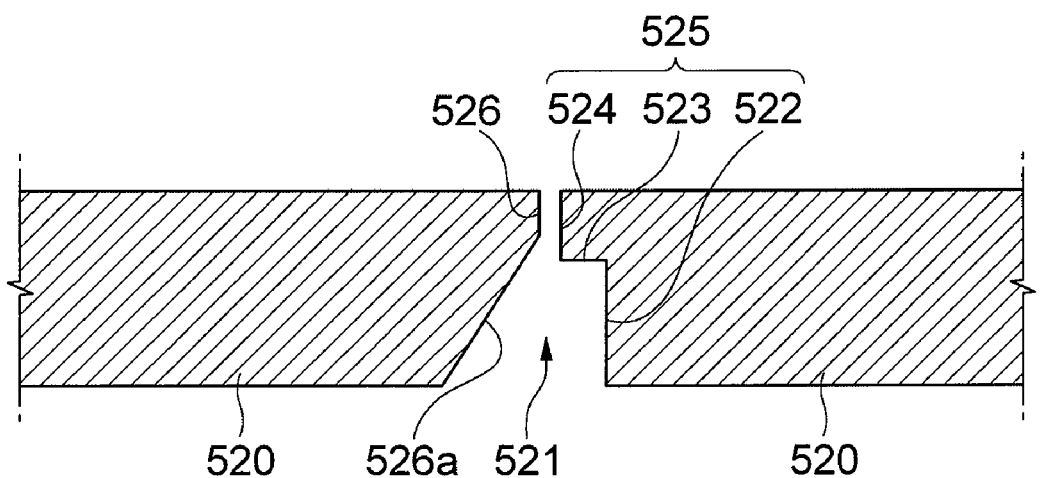
[FIG. 4]
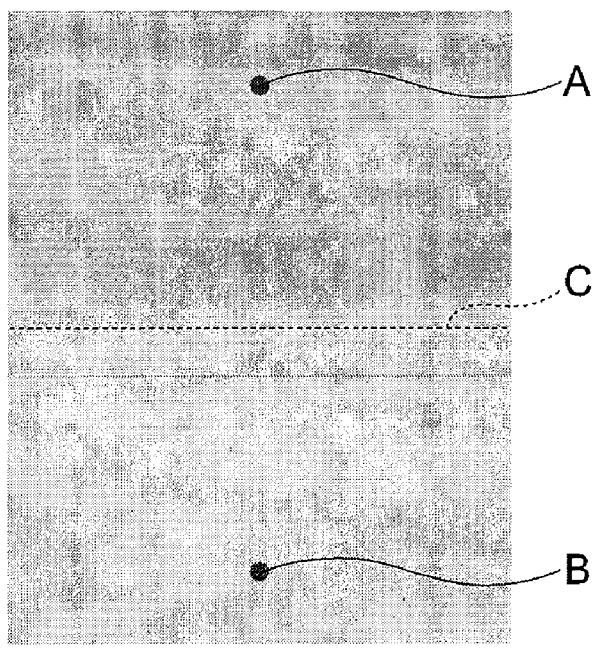

[FIG. 5]
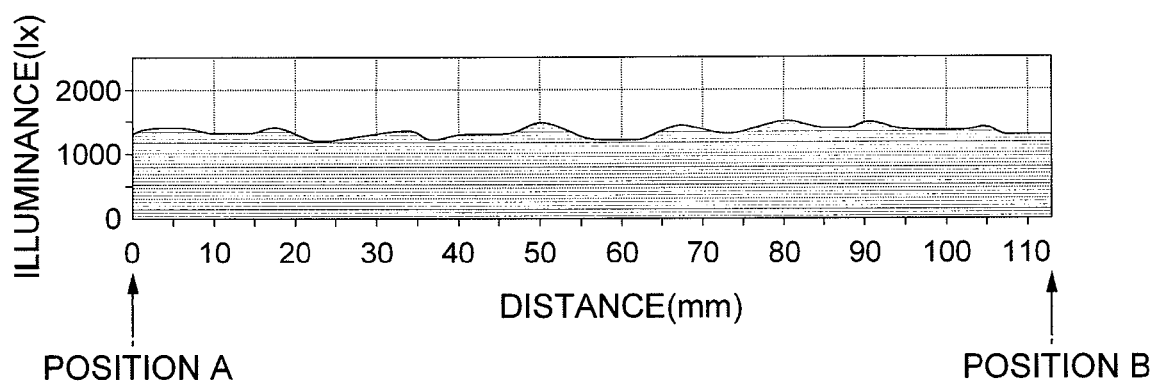

BACKLIGHT UNIT

CROSS-REFERENCE TO RELATED APPLICATIONS

This application claims the benefit of Korean Patent Application No. 10-2008-0093102 filed with the Korea Intellectual Property Office on Sep. 23, 2008, the disclosure of which is incorporated herein by reference.

BACKGROUND OF THE INVENTION

1. Field of the Invention

The present invention relates to a backlight unit which can implement a local dimming function.

2. Description of the Related Art

Liquid crystal display (LCD) devices have a number of advantages. Specifically, LCD devices have a low weight and a small thickness, can be driven with low power, and can implement high resolution. Therefore, cathode-ray tubes are being replaced with LCD devices.

An LCD device includes a backlight unit and a liquid crystal panel. The backlight unit generates light to provide to the liquid crystal panel. The liquid crystal panel displays an image by adjusting the transmittance of the light provided from the backlight unit.

The backlight unit may be divided into a direct type and an edge type depending on the position of a light source. The direct type backlight unit includes a light source disposed under the liquid crystal panel, and the edge type backlight unit includes a light source disposed on a side surface of the liquid crystal panel.

The direct type backlight unit has a structure that can implement a local dimming function. The local dimming function is referred to as a backlight driving method, in which a liquid crystal panel is divided into a plurality of regions, and the luminance value of a light source is adjusted for each divided region in accordance with a gray level corresponding to the divided region. Therefore, when the LCD device has a local dimming function, a high contrast ratio and a clear image can be implemented. Further, since the light source can be driven only for a desired region, it is possible to reduce power consumption.

However, the direct type backlight unit requires higher power consumption than the edge type backlight unit. To secure uniformity of light, the direct type backlight unit should have a sufficient thickness. Therefore, there is a limit in reducing the thickness of the backlight unit, that is, the thickness of the LCD device.

Meanwhile, the edge type backlight unit requires lower power consumption than the direct type backlight unit, and can be manufactured with a small thickness. In the edge type backlight unit, however, although light is partially provided to a light guide plate through a local dimming function, the light is uniformly emitted to the upper portion by the light guide plate. That is, the edge type backlight unit cannot obtain an effect of the local dimming function. For example, the improvement of contrast ratio cannot be achieved.

Therefore, there is a limit in applying the local dimming function to the edge backlight unit.

SUMMARY OF THE INVENTION

An advantage of the present invention is that it provides an edge type backlight unit which includes a plurality of light guide plates having a housing groove for housing a light source unit, thereby implementing a local dimming function.

Additional aspect and advantages of the present general inventive concept will be set forth in part in the description which follows and, in part, will be obvious from the description, or may be learned by practice of the general inventive concept.

According to an aspect of the invention, a backlight unit comprises a plurality of light guide plates that each include a first side surface having a housing groove, an upper surface bent and extending from an edge of the first side surface, a flat lower surface facing the upper surface, and a second side surface facing the first side surface of an adjacent light guide plate, and are disposed in parallel; a plurality of light source units that are disposed in the housing grooves of the respective light guide plates; and a bottom case that houses the light guide plates and the light source units.

Each of the housing grooves may be formed by a first surface extending upward from an edge of the lower surface and facing the rear side of the light source unit and a second surface extending from an edge of the first surface and facing a side surface of the light source unit.

The first surface may be formed of any one selected from a diffusing surface, a reflecting surface, and an optical polished surface. The second surface may be formed of a diffusing surface.

The first side surface may include a third surface extending upward form the second surface and facing the second side surface of an adjacent light guide plate in parallel. The third surface may be formed of any one selected from a diffusing surface, a reflecting surface, and an optical polished surface.

The housing groove may be formed to have a rectangular, triangular, or trapezoidal cross-section.

The second side surface may be an incident surface on which light from the light source unit is incident. Alternatively, the first side surface may be an incident surface on which light from the light source unit is incident.

Each of the light guide plates may include an inclined surface facing the first side surface.

Each of the light source units may include any one of a light emitting diode (LED), a cold cathode fluorescent lamp (CCFL), and an external electrode fluorescent lamp (EEFL).

Each of the light source units may include a printed circuit board (PCB) and a plurality of light sources mounted on the PCB.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a perspective view of a backlight unit according to an embodiment of the invention;

FIG. 2 is a partial cross-sectional view of the backlight unit shown in FIG. 1;

FIGS. 3A to 3D are cross-sectional views of modifications of a light guide plate provided in the back light unit according to the invention;

FIG. 4 is a photograph showing the illuminance of the backlight unit according to the invention; and FIG. 5 is a graph showing illuminance distribution according to a distance between two positions A and B of FIG. 4.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures. In the drawings, the thicknesses of layers and regions are exaggerated for clarity. Throughout the specification, like reference numerals represent the same components.

FIG. 1 is a perspective view of a backlight unit according to an embodiment of the invention. FIG. 2 is a partial cross-sectional view of the backlight unit shown in FIG. 1.

The backlight unit may include a plurality of light guide plates. In FIGS. 1 and 2, however, only two light guide plates are illustrated for convenience of description.

Referring to FIGS. 1 and 2, the backlight unit includes a bottom case 110, a plurality of light guide plates 120 disposed in parallel to the bottom case 110, and a light source unit 130 disposed in one side of each of the light guide plates 120.

Specifically, the bottom case 110 has a housing space for housing the light guide plates 120 and the light source units 130. For example, the housing space may be formed by the bottom surface of the bottom case 110 and a side wall extending upward from an edge of the bottom surface.

As the light source units 130 are disposed at the edges of the light guide plates 120, respectively, a local dimming function may be provided to the edge type backlight unit. That is, each of the light source units 130 can provide light having an adjusted luminance value to the corresponding light guide plate 120, and the light guide plate 120 can provide the light to a selected region of a liquid crystal panel.

Each of the light guide plates 120 includes a first side surface 125 having a housing groove 121, a second side surface 126 facing the first side surface 125 of an adjacent light guide plate 120, a lower surface 127 bent and extending from the edge of the first side surface 125, and an upper surface 128 facing the lower surface 127. The second side surface 126 may serve as an incident surface on which light emitted from the light source unit 130 is incident. The lower surface 127 may serve as a reflecting surface which totally reflects the light upward. Although not shown, a plurality of optical patterns may be disposed on the lower surface 127. Further, the upper surface 128 may serve as an emission surface from which the light is emitted to the outside.

The plurality of light guide plates 120 may be disposed in such a manner that the first side surface 125 of one light guide plate 120 faces the second side surface 126 of an adjacent light guide plate 120. For example, the plurality of light guide plates 120 may include first and second light guide plates 120a and 120b adjacent to each other. In this case, the first and second light guide plates 120a and 120b may be disposed in such a manner that the first side surface 125 of the light guide plate 120a faces the second side surface 126 of the light guide plate 120b.

The light source unit 130 is disposed between the adjacent light guide plates, for example, between the first side surface of the first light guide plate 120a and the second side surface of the second light guide plate 120b. In this case, the light source unit 130 is housed in the housing groove 121 formed on the first side surface 125. Accordingly, the plurality of light guide plates 120 do not need to be spaced a predetermined distance from one another, in order to install the light source units 130 between the respective light guide plates 120. Therefore, the backlight unit can be formed in a compact type. Further, since the distance between the light guide plates 120 can be reduced, it is possible to prevent light from leaking from between the light guide plates 120.

The housing groove 121 may be formed by a first surface 122 extending upward from an edge of the lower surface 127 and a second surface 122 extending from an edge of the first surface 122. In this case, when light is incident on the second side surface 126 of the second light guide plate 120b, the first surface 122 faces the rear side of the light source unit 130 and the second surface 123 faces a side surface of the light source unit 130.

By adjusting the optical characteristics of the second surface 123 of the housing groove 12, it is possible to prevent a hot spot from occurring due to light leaking from between the light guide plates 120. For example, the first surface 122 may be formed of any one selected from a diffusing surface, a reflecting surface, and an optical polished surface. The first surface 122 reflects some of leaking light to the second side surface 126, and absorbs or transmits the other of the leaking light. The second surface 123 may be formed of a diffusing surface. The second surface 123 may have a reflectance of 40 to 70%. When the reflectance of the second surface 123 is less than 40%, a hot spot which becomes brighter than the upper surface 128 of the light guide plate 120 may occur at the boundary between the light guide plates 120. On the other hand, when the reflectance of the second surface 123 is more than 70%, a dark spot which becomes darker than the upper surface 128 of the light guide plate 120 may occur at the boundary between the light guide plates 120.

The first side surface 125 may further include a third surface 124 extending to the housing groove 121, that is, extending upward from an edge of the second surface 123. The third surface 124 may be disposed to face the second side surface 126 of the adjacent light guide plate 120 in parallel. The third surface 124 may be formed of any one selected from a diffusing surface, a reflecting surface, and an optical polished surface.

In other words, the second surface 123 of the housing groove 121 is formed of a diffusing surface, and the optical characteristics of the first and third surfaces 122 and 124 do not have an effect upon the occurrence of hot spot. However, when one of the first and third surfaces 122 and 124 has a larger area the other one and is formed of an optical polished surface, an amount of light to be transmitted increases, so that a hot spot may occurs. Therefore, the one surface having a larger area informed of a diffusing surface or reflecting surface, except for an optical polished surface. For example, when the third surface 124 has a larger area than the first surface 122, the first surface 122 may be formed of any one selected from an optical polished surface, a reflecting surface, and a diffusing surface. However, the third surface 124 may be formed of a reflecting surface or diffusing surface. On the other hand, when the third surface 124 has a smaller area than the first surface 122, the third surface 124 may be formed of any one selected from an optical polished surface, a reflecting surface, and a diffusing surface. The first surface 122 may be formed of a reflecting surface or diffusing surface.

The optical characteristics of the first to third surfaces, or specifically, the optical characteristic of the second surface may be adjusted by changing the concentration of white ink applied on the surface.

In this embodiment, it has been described that the shape of the housing groove provided in the light guide plate is rectangular. However, the shape of the housing groove is not limited thereto.

Hereinafter, various examples of the housing groove provided in the light guide plate according to the present invention will be described with reference to FIGS. 3A to 3D.

FIGS. 3A to 3D are cross-sectional views of modifications of the light guide plate provided in the back light unit according to the invention.

As shown in FIG. 3A, a light guide plate 220 according to a first modification may include a housing groove 221 having a trapezoidal cross-section defined by a first surface 222 formed in a straight line shape and a second surface 223 extending obliquely from the first surface 222.

As shown in FIG. 3B, a light guide plate 320 according to a second modification may include a housing groove 321 having a triangular cross-section defined by a first surface 322 extending obliquely from an edge of a lower surface 327 to an edge of an upper surface 328.

As shown in FIG. 3C, a light guide plate 420 according to a third modification may include a housing groove 421 having a trapezoidal cross-section defined by a first surface 422 formed in a straight line shape and a second surface 423 extending obliquely from the first surface 422. The light guide plate 420 may include a third surface 424 extending upward from the second surface 423 of the housing groove 421.

As shown in FIG. 3D, a light guide plate 520 according to a fourth modification may include a housing groove 521 formed by a first surface 522 formed in a straight line shape and a second surface 523 extending from the first surface 522. In this case, a first side surface 525 having the housing groove 521 formed therein may serve as an incident surface on which light is incident. That is, the housing groove 521 for housing the light source unit 130 (refer to FIG. 2) may be provided on the incident surface. At this time, a second side surface 526 of an adjacent light guide plate facing the first side surface 525 of the light guide plate 520 may include an inclined surface 526a extending upward. The inclined surface 526a serves to effectively reflect light leaking from the rear side of an adjacent light source unit, thereby preventing a hot spot from occurring.

Returning to FIGS. 1 and 2, each of the light guide plates 120 has the flat lower surface 127. Further, the lower surfaces 127 of the light guide plates 120 may be disposed on a straight line. Therefore, it is easy to assemble the plurality of light guide plates 120, which makes it possible to enhance the assembling property of the backlight unit. When the backlight unit is applied to a large-sized display device, it is easy to adjust the flatness among the plurality of light guide plates 120. Further, since the lower surfaces 127 of the light guide plates 120 are flat, it is possible to easily perform the cutting process of the light guide plates 20 and the optical polishing process.

The light source unit 130 may include a light source 131 for forming light and a printed circuit board (PCB) 132 having a plurality of circuit patterns for applying a driving voltage of the light source 131. In this case, a plurality of light sources 131 may be mounted on the PCB 132.

The light source 131 may be a light emitting diode (LED) which emits light when a current is applied. The LED may be formed in various types. For example, the LED may include sub-LEDs which implement blue, green, and red colors, respectively. In this case, blue, green, and red lights emitted from the respective sub-LEDs which implement blue, green, and red colors can be mixed to implement white light. Alternatively, the LED may include a blue LED and phosphor which converts some of blue light emitted from the blue LED into yellow light. In this case, the blue light and the yellow light can be mixed to implement white light.

In the embodiment of the invention, it has been described that the light source unit includes an LED as the light source. Without being limited thereto, however, the light source of the light source unit may be a cold cathode fluorescent lamp (CCFL) or external electrode fluorescent lamp (EEFL).

Each of the light guide plates 120 may include a reflecting member 150 disposed under the lower surface thereof. The reflecting member 150 reflects light emitted downward from the light guide plate 120 such that the light is re-incident on the light guide plate 120, thereby enhancing optical efficiency of the backlight unit.

In the embodiment of the invention, it has been described that the plurality of light reflecting members 150 are disposed under the respective light guide plates 120. Without being limited thereon, however, one light reflecting member 150 may be disposed under the plurality of light guide plates.

In this case, since the lower surfaces of the light guide plates are disposed on a straight line, the reflecting member 150 can be easily attached.

The backlight unit may further include an optical member 160 disposed on the light guide plates 120. A diffusion plate, diffusion sheet, prism sheet, or protective sheet may be used as the optical member 160.

Hereinafter, the luminance characteristic of the backlight unit according to the invention will be described with reference to FIGS. 4 and 5. Each of the light guide plates provided in the backlight unit includes the housing groove formed by the first and second surfaces and the third surface extending from the housing groove. The first and second surfaces are formed of a diffusing surface, and the third surface is formed of a reflecting surface. The diffusing surface has a reflectance of 45%, and the reflecting surface has a reflectance of 90%.

FIG. 4 is a photograph showing the illuminance of the backlight unit according to the invention. In FIG. 4, only two light guide plates among the plurality of light guide plates are illustrated.

As shown in FIG. 4, it can be found that the two light guide plates including the boundary C therebetween have uniform illuminance.

FIG. 5 is a graph showing illuminance distribution according to a distance between two positions A and B of FIG. 4.

As shown in FIG. 5, it can be found that the illuminance distribution from the position A (0 mm) to the position B (110 mm) is uniformly formed.

When the first and third surfaces are formed of a reflecting surface and the second surface is a diffusing surface, the same result is obtained. Therefore, the descriptions thereof are omitted.

In the backlight unit including the plurality of light guide plates, when the second surface of the housing groove for housing the light source unit in each of the light guide plates is formed of a diffusing surface, the luminance of the backlight unit is uniformly formed across the plurality of light guide plates and the boundaries between the light guide plates.

According to the present invention, since the backlight unit includes the plurality of light guide plates and the light source units disposed at the edges of the respective light guide plates, the backlight unit can have a local dimming function, and the effect of an edge-type backlight unit can be exhibited.

Further, since the housing grooves for housing the light source units are provided at the edges of the light guide plates, it is possible to implement a compact backlight unit.

The optical characteristics of the first side surface of each of the light guide plates including the housing groove are adjusted to improve an optical problem such as a hot spot, thereby enhancing the quality of the backlight unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A backlight unit comprising:
   a plurality of light guide plates that each include a first side surface having a housing groove, an upper surface bent and extending from an edge of the first side surface, a flat lower surface facing the upper surface, and a second side surface facing the first side surface of an adjacent light guide plate, the first and second side surfaces are disposed in parallel;
   a plurality of light source units that are disposed in the housing grooves of the respective light guide plates; and
   a bottom case that houses the light guide plates and the light source units,
   wherein each of the housing grooves is formed by a first surface extending upward from an edge of the lower surface and facing the rear side of the light source unit and a second surface extending from an edge of the first surface and facing a side surface of the light source unit.

2. The backlight unit according to claim 1, wherein the first surface is formed of any one selected from a diffusing surface, a reflecting surface, and an optical polished surface.

3. The backlight unit according to claim 1, wherein the second surface is formed of a diffusing surface.

4. The backlight unit according to claim 1, wherein the first side surface includes a third surface extending upward form the second surface and facing the second side surface of an adjacent light guide plate in parallel.

5. The backlight unit according to claim 4, wherein the third surface is formed of any one selected from a diffusing surface, a reflecting surface, and an optical polished surface.

6. The backlight unit according to claim 1, wherein the housing groove is formed to have a rectangular, triangular, or trapezoidal cross-section.

7. The backlight unit according to claim 1, wherein the second side surface is an incident surface on which light from the light source unit is incident.

8. The backlight unit according to claim 1, wherein the first side surface is an incident surface on which light from the light source unit is incident.

9. The backlight unit according to claim 8, wherein each of the light guide plates includes an inclined surface facing the first side surface.

10. The backlight unit according to claim 1, wherein each of the light source units includes any one of a light emitting diode (LED), a cold cathode fluorescent lamp (CCFL), and an external electrode fluorescent lamp (EEFL).

11. The backlight unit according to claim 1, wherein each of the light source units includes a printed circuit board (PCB) and a plurality of light sources mounted on the PCB.

* * * * *